United States Patent
Tanabe

(10) Patent No.: US 9,853,500 B2
(45) Date of Patent: Dec. 26, 2017

(54) POWER SUPPLY APPARATUS, METHOD, AND RECORDING MEDIUM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 14/139,405

(22) Filed: Dec. 23, 2013

(65) Prior Publication Data

US 2014/0183978 A1 Jul. 3, 2014

(30) Foreign Application Priority Data

Dec. 27, 2012 (JP) ................. 2012-284435

(51) Int. Cl.
*H02J 17/00* (2006.01)
*H02J 7/02* (2016.01)

(52) U.S. Cl.
CPC ............... *H02J 17/00* (2013.01); *H02J 7/025* (2013.01)

(58) Field of Classification Search
CPC . H02J 5/005; H02J 7/025; H02J 17/00; H04B 5/0025–5/0093; B60L 11/182; B60L 11/1829–11/1831; Y02T 90/122; H01F 38/14; H01F 2038/143–2038/146
USPC .......................................... 307/104; 320/108
See application file for complete search history.

(56) References Cited

U.S. PATENT DOCUMENTS

| 2011/0218502 A1* | 9/2011 | Iio ................. A61M 5/003 604/264 |
| 2016/0134334 A1* | 5/2016 | Park ................ H02J 5/005 307/104 |

FOREIGN PATENT DOCUMENTS

JP 2008-295273 A 12/2008

* cited by examiner

*Primary Examiner* — Rexford Barnie
*Assistant Examiner* — Elim Ortiz
(74) *Attorney, Agent, or Firm* — Canon U.S.A., Inc. IP Division

(57) ABSTRACT

A power supply apparatus includes a power supply unit configured to wirelessly supply power to a power receiving device, a first communication unit configured to perform short-range wireless communication and include a first communication mode and a second communication mode, a second communication unit configured to perform wireless communication, a selection unit configured to select the first communication mode or the second communication mode as a communication mode of the first communication unit in accordance with whether the power supply apparatus is in a first mode, a second mode, or a third mode, and a control unit configured to control the communication performed by the first communication unit in accordance with the communication mode of the first communication unit selected by the selection unit.

13 Claims, 6 Drawing Sheets

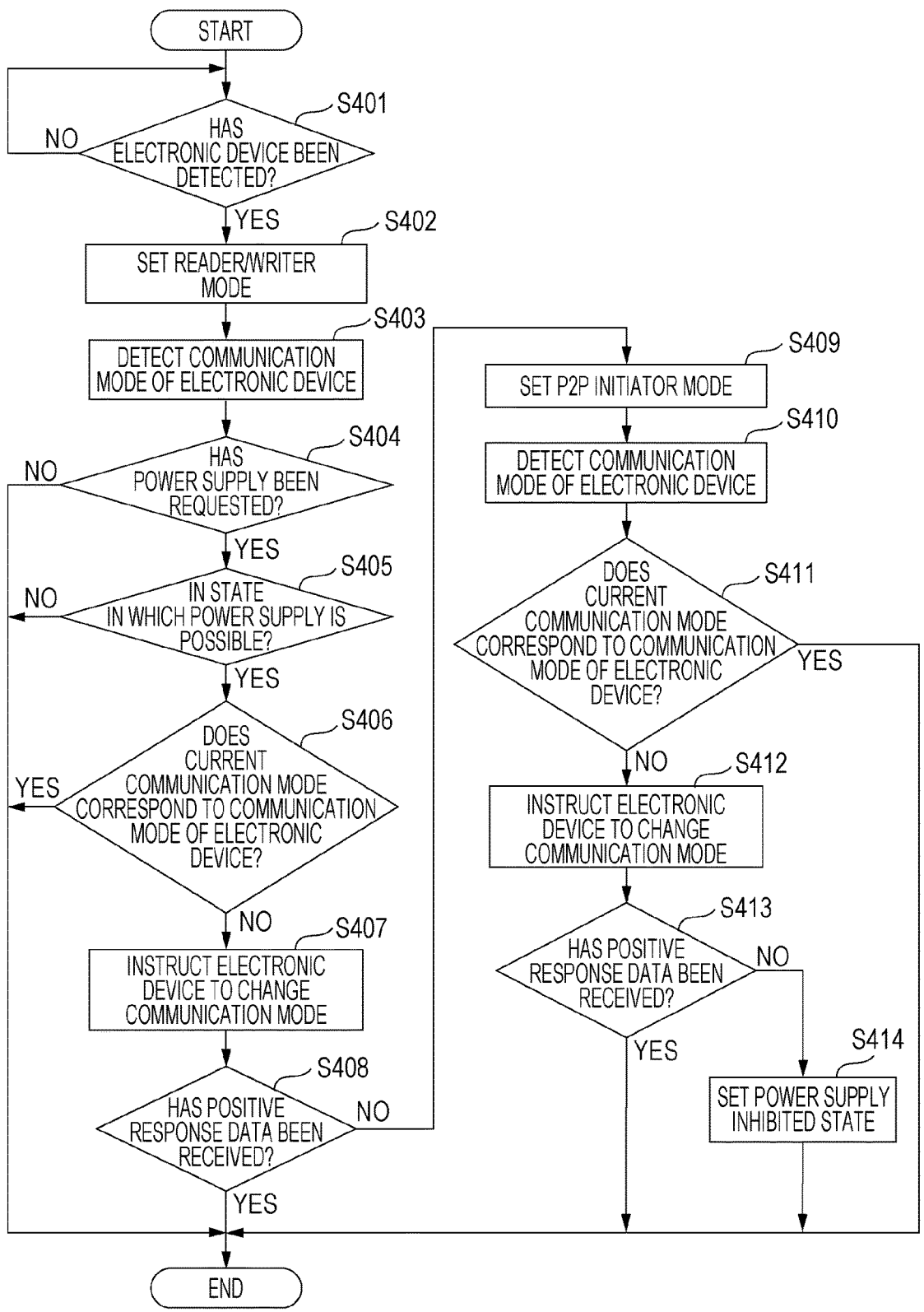

POWER SUPPLY APPARATUS, METHOD, AND RECORDING MEDIUM

BACKGROUND

Technical Field

The present disclosure relates to a power supply apparatus that performs wireless power supply.

Description of the Related Art

Currently, a power supply system is known in which a power supply apparatus that performs wireless power supply using a primary coil and an electronic device that receives power supplied from the power supply apparatus using a secondary coil are included. In Japanese Patent Laid-Open No. 2008-295273, it is known that, in such a power supply system, the power supply apparatus transmits power to the electronic device through electromagnetic induction.

Currently, if the power supply apparatus is capable of establishing a plurality of communication modes in which communication for controlling the power supply is performed, how the power supply apparatus selects one of the plurality of communication modes has not yet determined. Therefore, it is difficult for the power supply apparatus to select one of the plurality of communication modes for appropriately controlling the power supply to the electronic device and appropriately control the power supply to the electronic device.

SUMMARY OF THE INVENTION

The present invention aims to select an appropriate one of a plurality of communication modes and control power supply on the basis of the selected communication mode.

According to an aspect of the present invention, at least one of the above-described drawbacks and disadvantages are overcome.

According to another aspect of the present invention, there is provided a power supply apparatus including a power supply unit configured to wirelessly supply power to a power receiving device, a first communication unit configured to perform short-range wireless communication, in which the first communication unit includes a first communication mode and a second communication mode, a second communication unit configured to perform wireless communication, a selection unit configured to, (a) if the power supply apparatus is in a first mode, select the first communication mode or the second communication mode as a communication mode of the first communication unit in accordance with a corresponding communication mode of the power receiving device, (b) if the power supply apparatus is in a second mode, select the first communication mode or the second communication mode as the communication mode of the first communication unit in accordance with setting of authentication of the second communication unit, and (c) if the power supply apparatus is in the third mode, select the first communication mode as the communication mode of the first communication unit, in which the first mode includes a mode for wirelessly supplying power to the power receiving device, the second mode includes a mode for performing a communication performed by the second communication unit, and the third mode includes a mode for using electronic money, and a control unit configured to control the communication performed by the first communication unit in accordance with the communication mode of the first communication unit selected by the selection unit.

According to another aspect of the present invention, there is provided a method for controlling a power supply apparatus. The method includes the steps of wirelessly supplying power to a power receiving device, performing short-range wireless communication using a first communication unit, in which the first communication unit includes a first communication mode and a second communication mode, perform wireless communication using a second communication unit, selecting, if the power supply apparatus is in a first mode, the first communication mode or the second communication mode as a communication mode of the first communication unit in accordance with a corresponding communication mode of the power receiving device, in which the first mode includes a mode for wirelessly supplying power to the power receiving device, selecting, if the power supply apparatus is in a second mode, the first communication mode or the second communication mode as the communication mode of the first communication unit in accordance with setting of authentication of the second communication unit, in which the second mode includes a mode for performing a communication performed by the second communication unit, selecting, if the power supply apparatus is in the third mode, the first communication mode as the communication mode of the first communication unit, in which the third mode includes a mode for using electronic money, and controlling the communication performed by the first communication unit in accordance with the selected communication mode of the first communication unit.

According to another aspect of the present invention, there is provided a recording medium storing a program for causing a computer to execute a method for controlling a power supply apparatus. The method includes the steps of wirelessly supplying power to a power receiving device, performing short-range wireless communication using a first communication unit, in which the first communication unit includes a first communication mode and a second communication mode, perform wireless communication using a second communication unit, selecting, if the power supply apparatus is in a first mode, the first communication mode or the second communication mode as a communication mode of the first communication unit in accordance with a corresponding communication mode of the power receiving device, in which the first mode includes a mode for wirelessly supplying power to the power receiving device, selecting, if the power supply apparatus is in a second mode, the first communication mode or the second communication mode as the communication mode of the first communication unit in accordance with setting of authentication of the second communication unit, in which the second mode includes a mode for performing the communication performed by the second communication unit, selecting, if the power supply apparatus is in the third mode, the first communication mode as the communication mode of the first communication unit, in which the third mode includes a mode for using electronic money, and controlling the communication performed by the first communication unit in accordance with the selected communication mode of the first communication unit. According to another aspect of the present invention, there is provided a power supply apparatus including a communication unit configured to have a first communication mode and a second communication mode, a selection unit configured to select, based on an operation mode of the power supply apparatus, a communication mode of the communication unit, and a control unit configured to control, based on the communication mode of the communication unit selected by the selection unit, a communication of the communication unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 4 is a flowchart illustrating an example of a second setting process performed by the power supply apparatus according to the first embodiment.

DESCRIPTION OF THE EMBODIMENTS

Various exemplary embodiments, features, and aspects of the present invention will be described in detail below with reference to the drawings.

First Embodiment

Figure 1:
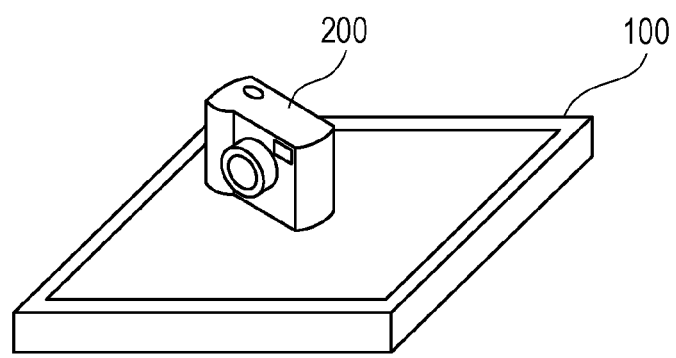
FIG. 1 is a diagram illustrating an example of a power supply system according to a first embodiment.

A first embodiment of the present invention will be described in detail hereinafter with reference to the drawings. A power supply system according to the first embodiment includes, as illustrated in FIG. 1, a power supply apparatus 100 and an electronic device 200. When a distance between the power supply apparatus 100 and the electronic device 200 is within a predetermined range in the power supply system according to the first embodiment, the power supply apparatus 100 wirelessly supplies power to the electronic device 200. When the distance between the power supply apparatus 100 and the electronic device 200 is within the predetermined range, the electronic device 200 may wirelessly receive power output from the power supply apparatus 100. When the distance between the power supply apparatus 100 and the electronic device 200 is not within the predetermined range, the electronic device 200 cannot receive power from the power supply apparatus 100. The predetermined range refers to a range within which the power supply apparatus 100 and the electronic device 200 may communicate with each other. The power supply apparatus 100 may wirelessly supply power to a plurality of electronic devices.

The electronic device 200 may be an image capture device such as a digital still camera, or may be a playback device. Alternatively, the electronic device 200 may be a communication device such as a mobile telephone or a smartphone. Alternatively, the electronic device 200 may be a battery pack including a battery. Alternatively, the electronic device 200 may be a device driven by power supplied from the power supply apparatus 100, such as a car. Alternatively, the electronic device 200 may be a device that receives television broadcast, a display that displays image data, or a personal computer. Alternatively, the electronic device 200 may be a device that operates using power supplied from the power supply apparatus 100 even when a battery is not mounted thereon. The electronic device 200 may be any external device that operates using power supplied from the power supply apparatus 100.

Figure 2:
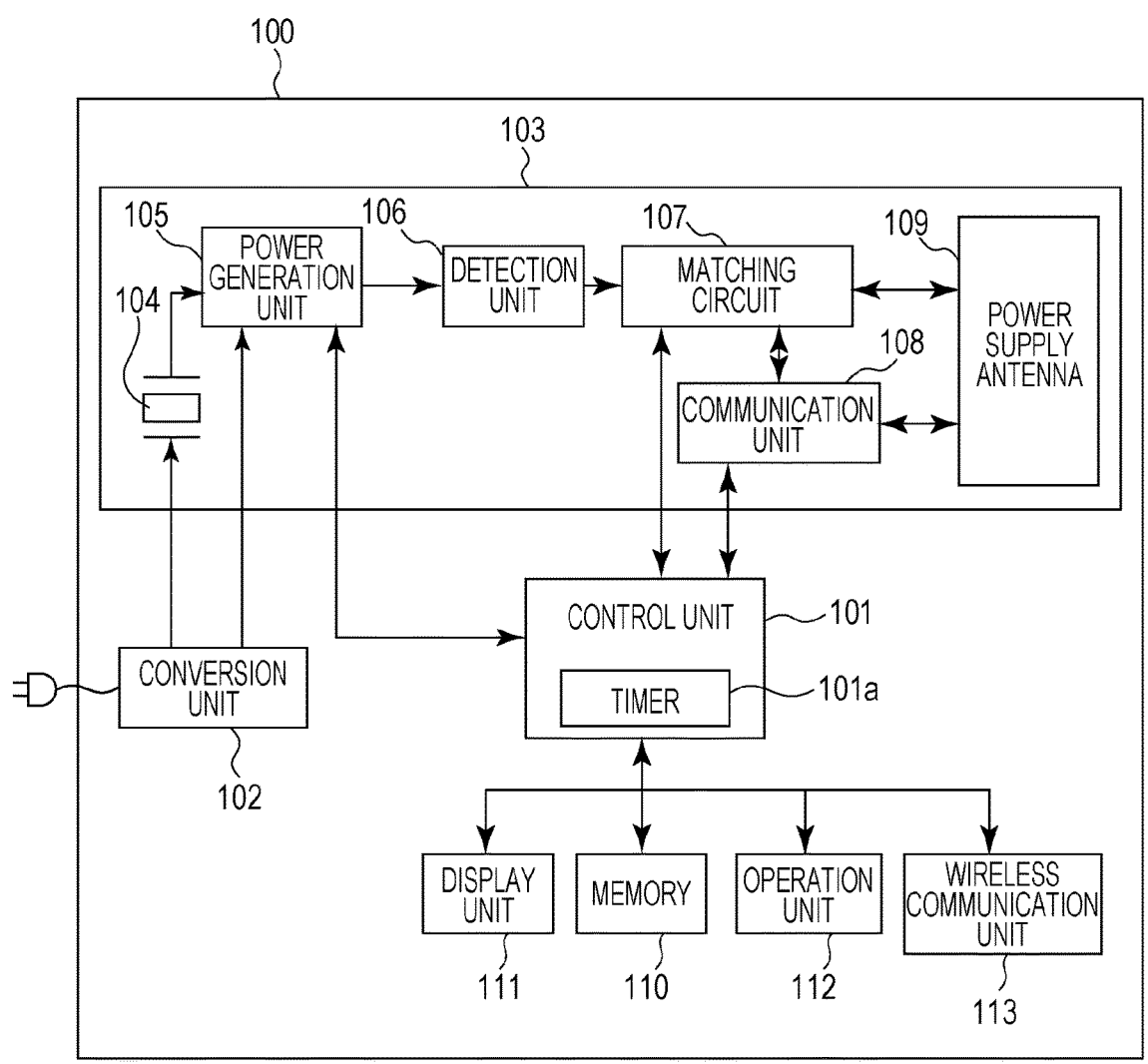
FIG. 2 is a block diagram illustrating an example of a power supply apparatus according to the first embodiment.

FIG. 2 is a diagram illustrating an example of the configuration of the power supply apparatus 100 according to the first embodiment. As illustrated in FIG. 2, the power supply apparatus 100 includes a control unit 101, a conversion unit 102, a power supply unit 103, an oscillator 104, a power generation unit 105, a detection unit 106, a matching circuit 107, a communication unit 108, and a power supply antenna 109. Furthermore, the power supply apparatus 100 includes a memory 110, a display unit 111, an operation unit 112, and a wireless communication unit 113.

The power supply unit 103 may be used, for example, for supplying power using a magnetic resonance method. The magnetic resonance method is a method in which the power supply apparatus 100 supplies power to the electronic device 200 in a state in which the power supply apparatus 100 and the electronic device 200 resonate. The state in which the power supply apparatus 100 and the electronic device 200 resonate is a state in which the resonant frequency of the power supply antenna 109 and the resonant frequency of an antenna of the electronic device 200 match.

The control unit 101 controls the power supply apparatus 100 by executing computer programs recorded in the memory 110. The control unit 101 includes, for example, a central processing unit (CPU) or a microprocessing unit (MPU). The control unit 101 is configured by hardware.

When an alternating current (AC) power supply, which is not illustrated, and the power supply apparatus 100 are connected to each other, the conversion unit 102 converts alternating current power supplied from the AC power supply, which is not illustrated, into direct current power, and supplies the direct current power obtained as a result of the conversion to the power supply apparatus 100. The direct current power is supplied from the conversion unit 102 to the power supply unit 103.

The oscillator 104 generates a frequency used for controlling the power generation unit 105. The oscillator 104 includes, for example, a quartz oscillator.

The power generation unit 105 generates power to be output to the outside through the power supply antenna 109 on the basis of the power supplied from the conversion unit 102 and the frequency generated by the oscillator 104. The power generated by the power generation unit 105 includes first power and second power. The first power generated by the power generation unit 105 is supplied to the power supply antenna 109 through the detection unit 106 and the matching circuit 107. The second power generated by the power generation unit 105 is supplied to the power supply antenna 109 through the detection unit 106 and the matching circuit 107.

The first power is used, for example, for wirelessly communicating with the electronic device 200 through the power supply antenna 109 using a predetermined communication method. The predetermined communication method is, for example, a near field communication (NFC) standard established by the NFC Forum. The NFC standard may be, for example, the ISO/IEC 18092 standard, the ISO/IEC 14443 standard, or the ISO/IEC 21481 standard. The first power is, for example, a power of 1 W or less. However, the first power is not limited to a power of 1 W or less insofar as the first power is power used for performing wireless communication based on the NFC standard.

The second power is used for charging the electronic device 200 or causing the electronic device 200 to perform a predetermined operation. When the second power is output through the power supply antenna 109, the power supply apparatus 100 cannot perform the wireless communication based on the NFC standard through the power supply antenna 109. The second power is, for example, a power of 2 W or more. However, the second power is not limited to a power of 2 W or more insofar as the second power is larger than the first power. Alternatively, the second power may be set on the basis of a value of power requested by the electronic device 200. Alternatively, the second power may be set on the basis of a value of power consumption of the electronic device 200.

The detection unit 106 detects whether or not the electronic device 200 is located close to the power supply apparatus 100 on the basis of a traveling wave of power output from the power supply antenna 109 and a reflected wave of the power output from the power supply antenna 109.

The matching circuit 107 is a resonant circuit for generating resonance between the power supply antenna 109 and the antenna of the electronic device 200. The matching circuit 107 sets the resonant frequency of the power supply antenna 109. The matching circuit 107 includes a circuit for performing impedance matching between the power generation unit 105 and the power supply antenna 109. When the power supply apparatus 100 outputs the first power or the second power through the power supply antenna 109, the control unit 101 controls the matching circuit 107 such that the matching circuit 107 sets the resonant frequency of the power supply antenna 109 to a predetermined frequency. The predetermined frequency may be, for example, 13.56 MHz, or may be 6.78 MHz. Alternatively, the predetermined frequency may be tens of MHz. Alternatively, the predetermined frequency may be a frequency specified in the NFC standard. When the power supply apparatus 100 outputs the first power or the second power, the control unit 101 controls the matching circuit 107 such that the matching circuit 107 sets the resonant frequency of the power supply antenna 109 to the predetermined frequency.

The communication unit 108 performs wireless communication on the basis of the NFC standard. The communication unit 108 includes at least a "reader/writer mode" or a "peer-to-peer initiator mode" as a communication mode thereof. The "reader-writer mode" and the "peer-to-peer initiator mode" are specified in the NFC standard. The "peer-to-peer initiator mode" may be referred to as a "P2P initiator mode". Alternatively, the "peer-to-peer initiator mode" may be referred to as a "P2P mode".

A case in which the communication unit 108 is in the reader/writer mode will be described hereinafter. The reader/writer mode corresponds to a "card emulation mode" specified in the NFC standard. When the communication unit 108 is in the reader/writer mode, the communication unit 108 communicates with the electronic device 200 that is in the card emulation mode in a unidirectional manner on the basis of the NFC standard.

The electronic device 200 in the card emulation mode records, in a memory, a predetermined data table storing information used for supplying power wirelessly in advance. In the predetermined data table, for example, status information indicating the state of the electronic device 200 and an address corresponding to the status information are associated with each other and stored. The status information includes, for example, information indicating the operation state of the electronic device 200, information relating to the charge of a battery connected to the electronic device 200, and information indicating the power receiving state of the electronic device 200. The information indicating the operation state of the electronic device 200 includes, for example, information indicating the power consumption of the electronic device 200 and information indicating the operation mode of the electronic device 200. The information relating the charge of a battery connected to the electronic device 200 includes, for example, information indicating whether or not the electronic device 200 is trickle-charging the battery and information indicating whether or not the electronic device 200 is quick-charging the battery. In addition, the information regarding the charge of a battery connected to the electronic device 200 includes, for example, information indicating the remaining capacity of the battery and information indicating the time taken for the battery to be fully charged. In addition, the information relating to the charge of a battery connected to the electronic device 200 includes information indicating whether or not the charging of the battery has been completed. The information indicating the power receiving state of the electronic device 200 includes, for example, information indicating maximum power that may be received by the electronic device 200 and information indicating power received by the electronic device 200 from the power supply apparatus 100.

In addition, the status information may include information indicating whether or not the electronic device 200 is connected to a battery and information indicating whether or not the electronic device 200 is connected to a power supply apparatus other than the power supply apparatus 100. The power supply apparatus other than the power supply apparatus 100 is, for example, an AC adapter. Alternatively, the power supply apparatus other than the power supply apparatus 100 is, for example, an apparatus that supplies power to the electronic device 200 in accordance with a Universal Serial Bus (USB) standard or an Ethernet (registered trademark) standard.

In addition, the status information may include information indicating the internal temperature of the electronic device 200 and information indicating an error. The information indicating an error includes information indicating whether or not an error has occurred in the electronic device 200 and information indicating whether or not an error has occurred in a battery connected to the electronic device 200. In addition, the information indicating an error includes, for example, information indicating whether or not overvoltage is being applied to the electronic device 200 and information indicating whether or not overcurrent is flowing into the electronic device 200.

In addition, the status information may include information indicating identification information such as an apparatus identifier (ID) of the electronic device 200 and a manufacture ID. In addition, the status information may include the version of a protocol corresponding to the electronic device 200.

The electronic device 200 regularly detects the status information, and updates the status information stored in the predetermined data table.

The power supply apparatus 100 may obtain desired information from the predetermined data table stored in the electronic device 200 by transmitting first data including an address corresponding to the desired information to the electronic device 200. For example, when the power supply apparatus 100 obtains the status information from the electronic device 200, the communication unit 108 transmits the first data including an address corresponding to the status information to the electronic device 200. When the power supply apparatus 100 transmits the first data to the electronic device 200, the communication unit 108 superimposes the first data upon the first power supplied from the power generation unit 105 and outputs the resultant first power to the power supply antenna 109. By outputting the first power upon which the first data is superimposed through the power supply antenna 109, the communication unit 108 transmits the first data to the electronic device 200. The communication unit 108 performs amplitude-shift keying (ASK) modulation in order to superimpose the first data upon the first power.

When the electronic device 200 in the card emulation mode has received the first data from the power supply apparatus 100, the electronic device 200 reads information corresponding to the address included in the first data from the predetermined data table. Furthermore, the electronic device 200 transmits the information read from the predetermined data table to the power supply apparatus 100 as response data corresponding to the first data. When the electronic device 200 is in the card emulation mode, the electronic device 200 performs load modulation in order to transmit the response data corresponding to the first data to the power supply apparatus 100.

When the electronic device 200 has performed the load modulation, current flowing to the power supply antenna 109 changes. Therefore, the communication unit 108 detects the current flowing to the power supply antenna 109, and receives the response data corresponding to the first data from the electronic device 200 on the basis of the detected current of the power supply antenna 109.

When the communication unit 108 is in the reader/writer mode, the power supply apparatus 100 may read the information used for supplying power wirelessly from the predetermined data table using the first data. Furthermore, when the communication unit 108 is in the reader/writer mode, the power supply apparatus 100 may write information used for supplying power wirelessly to the predetermined data table using the first data. Because the electronic device 200 regularly updates the information included in the predetermined data table regardless of whether or not the first data has been received from the power supply apparatus 100, the power supply apparatus 100 may read the status information from the electronic device 200 at a desired timing. When the communication unit 108 has been set to the reader/writer mode, the control unit 101 performs a process for controlling the wireless supply of power to the electronic device 200 using the status information obtained from the electronic device 200.

A case in which the communication unit 108 is in the P2P initiator mode will be described hereinafter. The P2P initiator mode corresponds to a "peer-to-peer passive mode (target mode)" specified in the NFC standard. The "peer-to-peer passive mode (target mode)" may be referred to as a "P2P passive mode (target mode)". Alternatively, the "peer-to-peer passive mode (target mode)" may be referred to as a "P2P mode". When the communication unit 108 is in the P2P initiator mode, the communication unit 108 communicates with the electronic device 200 that is in the P2P passive mode in a bidirectional manner on the basis of the NFC standard.

The power supply apparatus 100 may obtain third data including desired information from the electronic device 200 by transmitting second data for requesting the desired information to the electronic device 200. When the power supply apparatus 100 transmits the second data to the electronic device 200, the communication unit 108 superimposes the second data upon the first power supplied from the power generation unit 105 and outputs the resultant first power to the power supply antenna 109. By outputting the first power upon which the second data is superimposed through the power supply antenna 109, the communication unit 108 transmits the second data to the electronic device 200. For example, when the electronic device 200 in the P2P passive mode has received the second data for requesting the status information of the electronic device 200 from the power supply apparatus 100, the electronic device 200 analyzes the second data. Thereafter, the electronic device 200 begins a process for detecting the status information requested by the power supply apparatus 100 in accordance with a result of the analysis of the second data. When the detection of the status information has been completed, the electronic device 200 generates the third data including the detected status information. Thereafter, the electronic device 200 transmits the generated third data to the power supply apparatus 100 as response data corresponding to the second data.

When the communication unit 108 is in the P2P initiator mode, the power supply apparatus 100 may transmit the information used for supplying power wirelessly to the electronic device 200 using the second data. Furthermore, when the communication unit 108 is in the P2P initiator mode, the power supply apparatus 100 may receive the information used for supplying power wirelessly from the electronic device 200 using the second data. Because the electronic device 200 may spontaneously transmit the third data to the power supply apparatus 100, the power supply apparatus 100 may perform a process for controlling the wireless supply of power to the electronic device 200 in accordance with the data spontaneously transmitted from the electronic device 200. When the communication unit 108 has been set to the P2P initiator mode, the control unit 101 performs the process for controlling the wireless supply of power to the electronic device 200 using the status information obtained from the electronic device 200.

The power supply antenna 109 is an antenna for outputting the first power or the second power to the electronic device 200. The power supply antenna 109 may be a helical antenna or a loop antenna, or may be a planar antenna such as a meander line antenna.

The memory 110 records computer programs for controlling the power supply apparatus 100 and parameters relating to the power supply apparatus 100. The memory 110 also records data received from the electronic device 200.

The display unit 111 displays image data supplied from the memory 110.

The operation unit 112 provides a user interface for operating the power supply apparatus 100. The operation unit 112 includes buttons, switches, or a touch panel for operating the power supply apparatus 100. The control unit 101 controls the power supply apparatus 100 in accordance with a signal input through the operation unit 112.

The wireless communication unit 113 performs wireless communication different from that according to the NFC standard. Here, the wireless communication unit 113 performs wireless communication whose communication range is larger than that of the wireless communication according to the NFC standard. In addition, the wireless communication unit 113 performs wireless communication using a frequency band different from a frequency band used in the wireless communication according to the NFC standard. For example, the wireless communication unit 113 performs wireless communication according to a wireless local area network (LAN) standard or wireless communication according to a Bluetooth (registered trademark) standard.

In the first embodiment, the power supply apparatus 100 wirelessly transmits power to the electronic device 200, and the electronic device 200 wirelessly receives power from the power supply apparatus 100. However, power may be transmitted and received not "wirelessly" but "in a non-contact manner" or "contactlessly".

The power supply apparatus 100 according to the first embodiment may perform communication for controlling a supply of power to the electronic device 200 using the communication unit 108. When the power supply apparatus 100 supplies power to the electronic device 200, the power supply apparatus 100 needs to perform communication for controlling the wireless supply of power in accordance with one of the communication modes, namely the "reader/writer mode" and the "P2P initiator mode". Therefore, before outputting the second power to the electronic device 200, the power supply apparatus 100 needs to set the communication mode of the communication unit 108. The power supply apparatus 100 according to the first embodiment sets the communication mode of the communication unit 108 by performing a first setting process, a second setting process, or a third setting process. The first setting process, the second setting process, and the third setting process will be described hereinafter.

First Setting Process

Figure 3A:
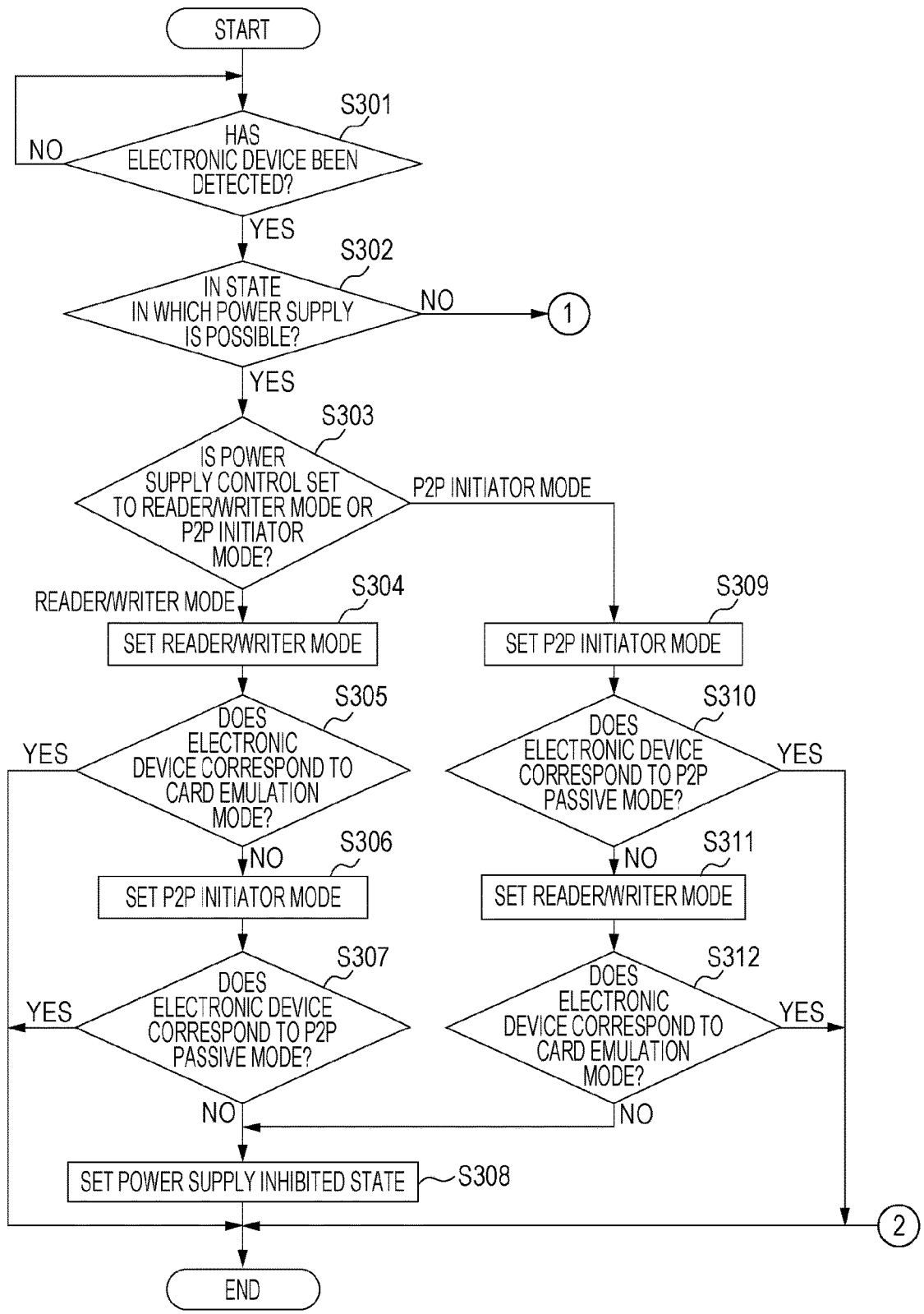
FIGS. 3A and 3B are flowcharts illustrating an example of a first setting process performed by the power supply apparatus according to the first embodiment.
Figure 3B:
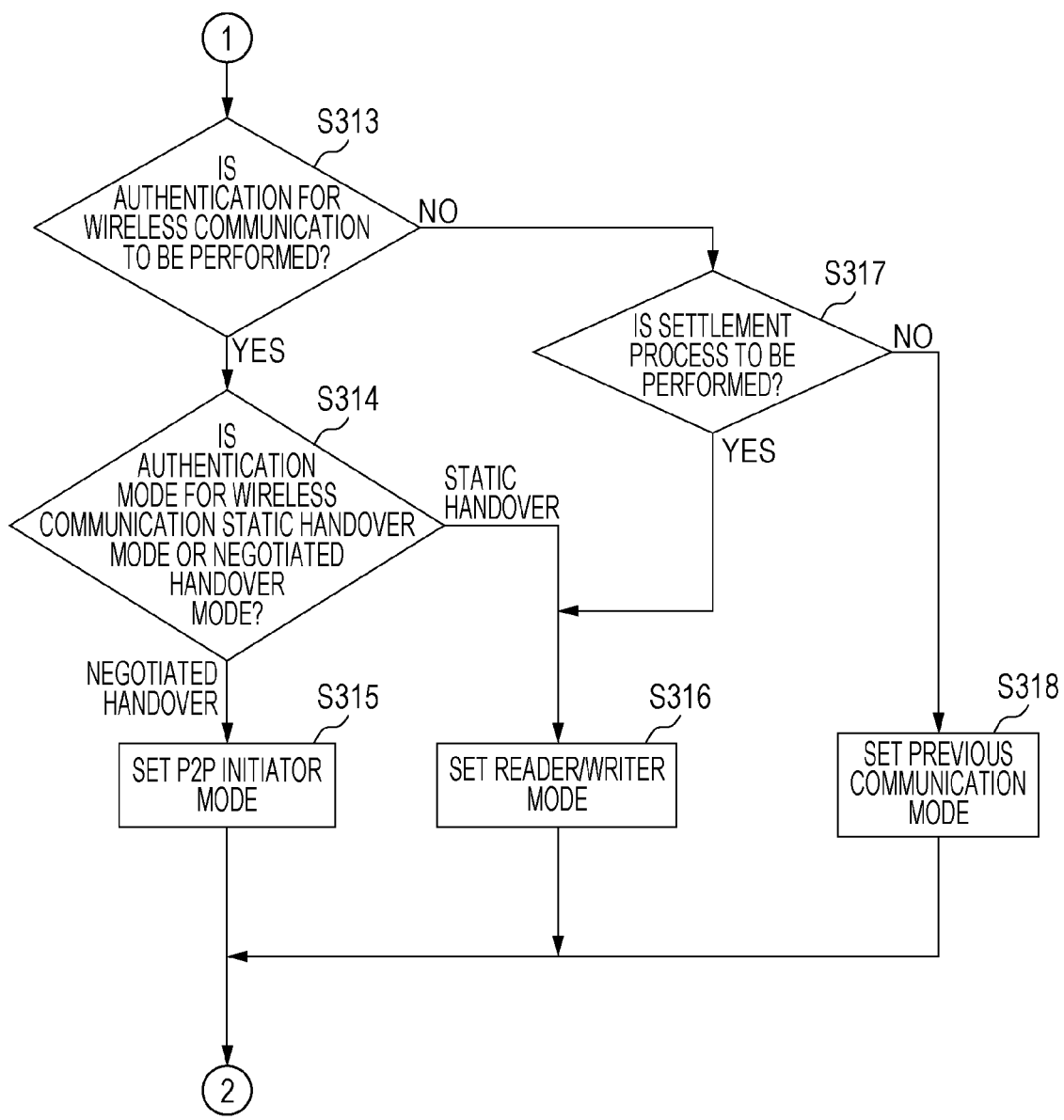

The first setting process performed by the power supply apparatus 100 in the first embodiment will be described with reference to flowcharts of FIGS. 3A and 3B. The first setting process illustrated in FIGS. 3A and 3B may be realized by executing a computer program stored in the memory 110 using the control unit 101. The first setting process is a process performed when the power supply apparatus 100 is turned on.

In S301, the control unit 101 determines whether or not the electronic device 200 is located in a predetermined range. In this case, the control unit 101 controls the oscillator 104 and the power generation unit 105 such that the first power is output through the power supply antenna 109. Thereafter, the control unit 101 controls the detection unit 106 such that whether or not the electronic device 200 is located in the predetermined range is detected. In this case, the detection unit 106 detects whether or not the electronic device 200 is located in the predetermined range on the basis of the traveling wave of the first power and the reflected wave of the first power. The control unit 101 determines whether or not the electronic device 200 is located in the predetermined range using a result of the detection performed by the detection unit 106.

If the control unit 101 determines that the electronic device 200 is located in the predetermined range (YES in S301), the process proceeds from S301 to S302. If the control unit 101 determines that the electronic device 200 is not located in the predetermined range (NO in S301), the process returns from S301 to S301.

In S302, the control unit 101 determines whether or not the power supply unit 103 is in a state in which the power supply unit 103 can start to supply power wirelessly. If the control unit 101 determines that the power supply unit 103 is in a state in which the power supply unit 103 can start to supply power wirelessly (YES in S302), the process proceeds from S302 to S303. If the control unit 101 determines that the power supply unit 103 is not in a state in which the power supply unit 103 can start to supply power wirelessly (NO in S302), the process proceeds from S302 to S313.

In S303, the control unit 101 determines whether the communication mode of the communication unit 108 is set to the reader/writer mode or the P2P initiator mode in setting of control relating to the wireless supply of power. If the control unit 101 determines that the communication mode of the communication unit 108 is set to the reader/writer mode, the process proceeds from S303 to S304. If the control unit 101 determines that the communication mode of the communication unit 108 is set to the P2P initiator mode, the process proceeds from S303 to S309.

In S304, the control unit 101 sets the communication mode of the communication unit 108 to the reader/writer mode. Furthermore, the control unit 101 records information indicating that the communication mode of the communication unit 108 has been set to the reader/writer mode in the memory 110. In this case, the process proceeds from S304 to S305.

In S305, the control unit 101 determines whether or not the communication mode of the electronic device 200 corresponds to the card emulation mode. In this case, the control unit 101 controls the communication unit 108 in the reader/writer mode such that data for inquiring whether or not the communication mode of the electronic device 200 corresponds to the card emulation mode is transmitted. Thereafter, the control unit 101 determines whether or not the communication mode of the electronic device 200 corresponds to the card emulation mode on the basis of response data from the electronic device 200.

If the control unit 101 determines that the communication mode of the electronic device 200 corresponds to the card emulation mode (YES in S305), the process ends. If the control unit 101 determines that the communication mode of the electronic device 200 does not correspond to the card emulation mode (NO in S305), the process proceeds from S305 to S306. The card emulation mode is specified in the NFC standard. The card emulation mode corresponds to the reader/writer mode, but does not correspond to the P2P initiator mode or the P2P passive (target) mode. Therefore, if the communication mode of the communication unit 108 is the reader/writer mode, the electronic device 200 in the card emulation mode can communication with the communication unit 108. If the communication mode of the communication unit 108 is not the reader/writer mode, however, the electronic device 200 in the card emulation mode cannot communicate with the communication unit 108.

In S306, the control unit 101 sets the communication mode of the communication unit 108 to the P2P initiator mode. Furthermore, the control unit 101 records information indicating that the communication mode of the communication unit 108 has been set to the P2P initiator mode in the memory 110. In this case, the control unit 101 deletes the information, which is recorded in the memory 110 in S304, indicating that the communication mode of the communication unit 108 has been set to the reader/writer mode. In this case, the process proceeds from S306 to S307.

In S307, the control unit 101 determines whether or not the communication mode of the electronic device 200 corresponds to the P2P passive (target) mode. In this case, the control unit 101 controls the communication unit 108 such that data for inquiring whether or not the communication mode of the electronic device 200 corresponds to the P2P passive (target) mode is transmitted. Thereafter, the control unit 101 determines whether or not the communication mode of the electronic device 200 corresponds to the P2P passive (target) mode on the basis of response data from the electronic device 200.

If the control unit 101 determines that the communication mode of the electronic device 200 corresponds to the P2P passive (target) mode (YES in S307), the process ends. If the control unit 101 determines that the communication mode of the electronic device 200 does not correspond to the P2P passive (target) mode (NO in S307), the process proceeds from S307 to S308. The P2P passive (target) mode is specified in the NFC standard. The P2P passive (target) mode corresponds to the P2P initiator mode, but does not correspond to the reader/writer mode or the card emulation mode. Therefore, if the communication mode of the communication unit 108 is the P2P initiator mode, the electronic device 200 in the P2P passive (target) mode may communicate with the communication unit 108. If the communication mode of the communication unit 108 is not the P2P initiator mode, however, the electronic device 200 in the P2P passive (target) mode cannot communicate with the communication unit 108.

In S308, the control unit 101 sets the power supply unit 103 to a power supply inhibited state. The power supply inhibited state is a state in which the power supply unit 103 is not allowed to output the second power. When the power supply unit 103 is in the power supply inhibited state, the control unit 101 controls the power supply unit 103 such that the second power is not output from the power supply antenna 109. Alternatively, when the power supply unit 103 is in the power supply inhibited state, the control unit 101 may control the power supply unit 103 in such a way as to allow the power supply unit 103 to output the first power in order to cause the communication unit 108 to perform communication according to the NFC standard. When the power supply unit 103 has been set to the power supply inhibited state, the process ends. Even when the power supply unit 103 has been set to the power supply inhibited state, the control unit 101 may perform the first setting process illustrated in FIGS. 3A and 3B again after a predetermined period of time elapses.

In S309, the control unit 101 sets the communication mode of the communication unit 108 to the P2P initiator mode. Furthermore, the control unit 101 records information indicating that the communication mode of the communication unit 108 has been set to the P2P initiator mode in the memory 110. In this case, the process proceeds from S309 to S310.

In S310, the control unit 101 determines, as in S307, whether or not the communication mode of the electronic device 200 corresponds to the P2P passive mode. If the control unit 101 determines that the communication mode of the electronic device 200 corresponds to the P2P passive mode (YES in S310), the process ends. If the control unit 101 determines that the communication mode of the electronic device 200 does not corresponds to the P2P passive mode (NO in S310), the process proceeds from S310 to S311.

In S311, the control unit 101 sets the communication mode of the communication unit 108 to the reader/writer mode. Furthermore, the control unit 101 records information indicating that the communication mode of the communication unit 108 has been set to the reader/writer mode in the memory 110. In this case, the control unit 101 deletes the information, which is recorded in the memory 110 in S309, indicating that the communication mode of the communication unit 108 has been set to the P2P initiator mode. In this case, the process proceeds from S311 to S312.

In S312, the control unit 101 determines, as in S305, whether or not the communication mode of the electronic device 200 corresponds to the card emulation mode.

If the control unit 101 determines that the communication mode of the electronic device 200 corresponds to the card emulation mode (YES in S312), the process ends. If the control unit 101 determines that the communication mode of the electronic device 200 does not correspond to the card emulation mode (NO in S312), the process proceeds from S312 to S308.

In S313, the control unit 101 determines whether or not to perform authentication for the wireless communication performed by the wireless communication unit 113. If the control unit 101 determines that authentication for the wireless communication performed by the wireless communication unit 113 is to be performed (YES in S313), the process proceeds from S313 to S314. If the control unit 101 determines that authentication for the wireless communication performed by the wireless communication unit 113 is not to be performed (NO in S313), the process proceeds from S313 to S317.

In S314, the control unit 101 determines whether a mode in which the authentication for the wireless communication is performed is a "static handover mode" or a "negotiated handover mode". If the control unit 101 determines that the mode in which the authentication for the wireless communication is performed is the "negotiated handover mode", the process proceeds from S314 to S315. If the control unit 101 determines that the mode in which the authentication for the wireless communication is performed is the "static handover mode", the process proceeds from S314 to S316.

In S315, the control unit 101 sets the communication mode of the communication unit 108 to the P2P initiator mode. Furthermore, the control unit 101 records information indicating that the communication mode of the communication unit 108 has been set to the P2P initiator mode in the memory 110. In this case, the process ends. In this case, the communication unit 108 set to the P2P initiator mode performs communication for obtaining data necessary for the authentication for the wireless communication performed by the wireless communication unit 113.

In S316, the control unit 101 sets the communication mode of the communication unit 108 to the reader/writer mode. Furthermore, the control unit 101 records information indicating that the communication mode of the communication unit 108 has been set to the reader/writer mode in the memory 110. In this case, the process ends. In this case, the communication unit 108 set to the reader/writer mode performs communication for obtaining data necessary for the authentication for the wireless communication performed by the wireless communication unit 113.

In S317, the control unit 101 determines whether or not to perform a settlement process. If the control unit 101 determines that the settlement process is to be performed (YES in S317), the process proceeds from S317 to S316. If the control unit 101 determines that the settlement process is not to be performed (NO in S317), the process proceeds from S317 to S318. The settlement process is, for example, a process for obtaining electronic money from an external apparatus in order for the power supply apparatus 100 to provide a predetermined service for the external apparatus. If the control unit 101 determines that the settlement process is to be performed (YES in S317), the communication unit 108 in the reader/writer mode performs communication for obtaining data necessary for the settlement process.

In S318, the control unit 101 sets the communication mode of the communication unit 108 to the communication mode of the communication unit 108 at a time when the power supply unit 103 has output the second power last time. If the communication mode of the communication unit 108 when the power supply unit 103 has output the second power last time is the reader/writer mode, the control unit 101 sets the communication mode of the communication unit 108 to the reader/writer mode. If the communication mode of the communication unit 108 when the power supply unit 103 has output the second power last time is the P2P initiator mode, the control unit 101 sets the communication mode of the communication unit 108 to the P2P initiator mode. In this case, the process ends.

Second Setting Process

The second setting process performed by the power supply apparatus 100 in the first embodiment will be described with reference to a flowchart of FIG. 4. The second setting process illustrated in FIG. 4 may be realized by executing a computer program stored in the memory 110 using the control unit 101. The second setting process is a process performed when the power supply apparatus 100 is turned on.

In S401, the control unit 101 determines, as in S301, whether or not the electronic device 200 is located in the predetermined range. If the control unit 101 determines that the electronic device 200 is located in the predetermined range (YES in S401), the process proceeds from S401 to S402. If the control unit 101 determines that the electronic device 200 is not located in the predetermined range (NO in S401), the process returns from S401 to S401.

In S402, the control unit 101 sets the communication mode of the communication unit 108 to the reader/writer mode. Furthermore, the control unit 101 records information indicating that the communication mode of the communication unit 108 has been set to the reader/writer mode in the memory 110. In this case, the process proceeds from S402 to S403.

In S403, the control unit 101 detects the communication mode of the electronic device 200. In this case, the control unit 101 controls the communication unit 108 such that data for requesting notification of the communication mode of the electronic device 200 is transmitted. Thereafter, the control unit 101 detects the communication mode of the electronic device 200 on the basis of response data from the electronic device 200. The control unit 101 records information indicating the detected communication mode of the electronic device 200 in the memory 110. In this case, the process proceeds from S403 to S404.

In S404, the control unit 101 determines whether or not the wireless supply of power performed by the power supply unit 103 has been requested. In this case, the control unit 101 controls the communication unit 108 such that data for inquiring whether or not the electronic device 200 has requested the power supply apparatus 100 to perform the wireless supply of power is transmitted. Thereafter, the control unit 101 detects whether or not the wireless supply of power performed by the power supply unit 103 has been requested on the basis of response data from the electronic device 200. If the control unit 101 determines that the wireless supply of power performed by the power supply unit 103 has been requested (YES in S404), the process proceeds from S404 to S405. If the control unit 101 determines that the wireless supply of power performed by the power supply unit 103 has not been requested (NO in S404), the process ends.

In S405, the control unit 101 determines, as in S302, whether or not the power supply unit 103 is in a state in which the power supply unit 103 can start to supply power. If the control unit 101 determines that the power supply unit 103 is in a state in which the power supply unit 103 can start to supply power wirelessly (YES in S405), the process proceeds from S405 to S406. If the control unit 101 determines that the power supply unit 103 is not in a state in which the power supply unit 103 can start to supply power (NO in S405), the process ends.

In S406, the control unit 101 determines whether or not the current communication mode of the communication unit 108 corresponds to the communication mode of the electronic device 200 on the basis of a result of the detection performed in S403.

For example, if the communication mode of the electronic device 200 is the card emulation mode, the control unit 101 determines that the current communication mode of the communication unit 108 corresponds to the communication mode of the electronic device 200. In addition, for example, if the communication mode of the electronic device 200 is the P2P passive mode, the control unit 101 determines that the current communication mode of the communication unit 108 does not correspond to the communication mode of the electronic device 200. In addition, for example, if the communication mode of the electronic device 200 is not the card emulation mode or the P2P passive mode, the control unit 101 determines that the current communication mode of the communication unit 108 does not correspond to the communication mode of the electronic device 200.

If the control unit 101 determines that the current communication mode of the communication unit 108 does not correspond to the communication mode of the electronic device 200 (NO in S406), the process proceeds from S406 to S407. If the control unit 101 determines that the current communication mode of the communication unit 108 corresponds to the communication mode of the electronic device 200 (YES in S406), the process ends.

In S407, the control unit 101 controls the communication unit 108 such that data for instructing the electronic device 200 to change the communication mode of the electronic device 200 to the card emulation mode is transmitted. In this case, the process proceeds from S407 to S408.

In S408, the control unit 101 determines whether or not the communication unit 108 has received positive response data in response to the data transmitted to the electronic device 200 in S407. If the control unit 101 determines that the communication unit 108 has received positive response data (YES in S408), the process ends. If the control unit 101 determines that the communication unit 108 has not received positive response data (NO in S408), the process proceeds from S408 to S409.

In S409, the control unit 101 sets the communication mode of the communication unit 108 to the P2P initiator mode. Furthermore, the control unit 101 records information indicating that the communication mode of the communication unit 108 has been set to the P2P initiator mode in the memory 110. In this case, the process proceeds from S409 to S410.

In S410, the control unit 101 detects the communication mode of the electronic device 200. In this case, the control unit 101 controls the communication unit 108 such that data for requesting notification of the communication mode of the electronic device 200 is transmitted. Thereafter, the control unit 101 detects the communication mode of the electronic device 200 on the basis of response data from the electronic device 200. The control unit 101 records information indicating the detected communication mode of the electronic device 200 in the memory 110. In this case, the process proceeds from S410 to S411.

In S411, the control unit 101 determines whether or not the current communication mode of the communication unit 108 corresponds to the communication mode of the electronic device 200 on the basis of a result of the detection performed in S410.

For example, if the communication mode of the electronic device 200 is the P2P passive mode, the control unit 101 determines that the current communication mode of the communication unit 108 corresponds to the communication mode of the electronic device 200. In addition, for example, if the communication mode of the electronic device 200 is the card emulation mode, the control unit 101 determines that the current communication mode of the communication unit 108 does not correspond to the communication mode of the electronic device 200. In addition, for example, if the communication mode of the electronic device 200 is not the card emulation mode or the P2P passive mode, the control unit 101 determines that the current communication mode of the communication unit 108 does not correspond to the communication mode of the electronic device 200.

If the control unit 101 determines that the current communication mode of the communication unit 108 does not correspond to the communication mode of the electronic device 200 (NO in S411), the process proceeds from S411 to S412. If the control unit 101 determines that the current communication mode of the communication unit 108 corresponds to the communication mode of the electronic device 200 (YES in S411), the process ends.

In S412, the control unit 101 controls the communication unit 108 such that data for instructing the electronic device 200 to change the communication mode of the electronic device 200 to the P2P passive mode is transmitted. In this case, the process proceeds from S412 to S413.

In S413, the control unit 101 determines whether or not the communication unit 108 has received positive response data in response to the data transmitted to the electronic device 200 in S412. If the control unit 101 determines that the communication unit 108 has received positive response data (YES in S413), the process ends. If the control unit 101 determines that the communication unit 108 has not received positive response data (NO in S413), the process proceeds from S413 to S414.

In S414, the control unit 101 sets, as in S308, the power supply unit 103 to the power supply inhibited state. In this case, the process ends. Even if the power supply unit 103 has been set to the power supply inhibited state, the control unit 101 may perform the second setting process illustrated in FIG. 4 again after a predetermined period of time elapses.

Third Setting Process

Figure 5:
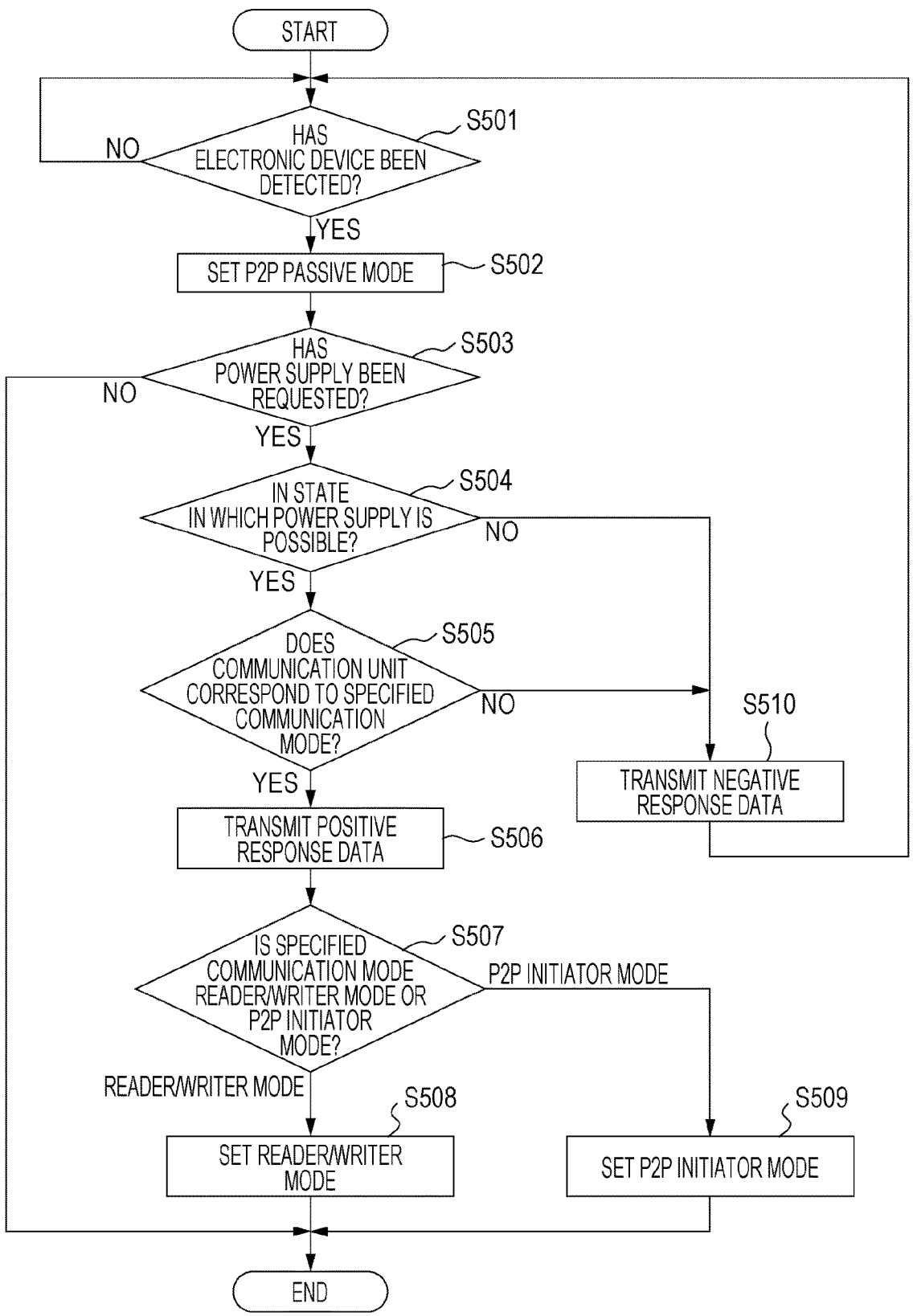
FIG. 5 is a flowchart illustrating an example of a third setting process performed by the power supply apparatus according to the first embodiment.

The third setting process performed by the power supply apparatus 100 in the first embodiment will be described with reference to a flowchart of FIG. 5. The third setting process illustrated in FIG. 5 may be realized by executing a computer program stored in the memory 110 using the control unit 101. The third setting process is a process performed when the power supply apparatus 100 is turned on.

In S501, the control unit 101 determines, as in S301, whether or not the electronic device 200 is located in the predetermined range. If the control unit 101 determines that the electronic device 200 is located in the predetermined range (YES in S501), the process proceeds from S501 to S502. If the control unit 101 determines that the electronic device 200 is not located in the predetermined range (NO in S501), the process returns from S501 to S501.

In S502, the control unit 101 sets the communication mode of the communication unit 108 to the P2P passive mode. Furthermore, the control unit 101 records information indicating that the communication mode of the communication unit 108 has been set to the P2P passive mode in the memory 110. In this case, the process proceeds from S502 to S503.

In S503, the control unit 101 determines whether or not the wireless supply of power performed by the power supply unit 103 has been requested. In this case, the control unit 101 determines whether or not the communication unit 108 has received data for requesting the power supply apparatus 100 to perform the wireless supply of power from the electronic device 200. If the communication unit 108 has received the data for requesting the power supply apparatus 100 to perform the wireless supply of power from the electronic device 200, the control unit 101 determines that the wireless supply of power performed by the power supply unit 103 has been requested. If the communication unit 108 has not received the data for requesting the power supply apparatus 100 to perform the wireless supply of power from the electronic device 200, the control unit 101 determines that the wireless supply of power performed by the power supply unit 103 has not been requested.

If the control unit 101 determines that the wireless supply of power performed by the power supply unit 103 has been requested (YES in S503), the process proceeds from S503 to S504. If the control unit 101 determines that the wireless supply of power performed by the power supply unit 103 has not been requested (NO in S503), the process ends.

In S504, the control unit 101 determines, as in S302, whether or not the power supply unit 103 is in a state in which the power supply unit 103 can start to supply power. If the control unit 101 determines that the power supply unit 103 is in a state in which the power supply unit 103 can start to supply power (YES in S504), the process proceeds from S504 to S505. If the control unit 101 determines that the power supply unit 103 is not in a state in which the power supply unit 103 can start to supply power (NO in S504), the process proceeds from S504 to S510.

In S505, the control unit 101 determines whether or not the communication unit 108 corresponds to a communication mode specified by the electronic device 200. If a result of S503 is YES, the data for requesting the power supply apparatus 100 to perform the wireless supply of power received by the communication unit 108 includes data for specifying the communication mode of the communication unit 108. The control unit 101 detects the communication mode specified by the electronic device 200 in the data received by the communication unit 108, and determines whether or not the communication unit 108 corresponds to the communication mode specified by the electronic device 200.

In this case, if the communication mode specified by the electronic device 200 is the reader/writer mode or the P2P initiator mode, the control unit 101 determines that the communication unit 108 corresponds the communication mode specified by the electronic device 200. In this case, if the communication mode specified by the electronic device 200 is not the reader/writer mode or the P2P initiator mode, the control unit 101 determines that the communication unit 108 does not correspond to the communication mode specified by the electronic device 200.

If the control unit 101 determines that the communication unit 108 corresponds to the communication mode specified by the electronic device 200 (YES in S505), the process proceeds from S505 to S506. If the control unit 101 determines that the communication unit 108 does not correspond to the communication mode specified by the electronic device 200 (NO in S505), the process proceeds from S505 to S510.

In S506, the control unit 101 controls the communication unit 108 such that positive response data is transmitted in response to the data received by the communication unit 108 from the electronic device 200 in S503. In this case, the process proceeds from S506 to S507.

In S507, the control unit 101 determines whether the communication mode specified by the electronic device 200 is the reader/writer mode or the P2P initiator mode. If the control unit 101 determines that the communication mode specified by the electronic device 200 is the reader/writer mode, the process proceeds from S507 to S508. If the control unit 101 determines that the communication mode specified by the electronic device 200 is the P2P initiator mode, the process proceeds from S507 to S509.

In S508, the control unit 101 sets the communication mode of the communication unit 108 to the reader/writer mode. Furthermore, the control unit 101 records information indicating that the communication mode of the communication unit 108 has been set to the reader/writer mode in the memory 110. In this case, the process ends.

In S509, the control unit 101 sets the communication mode of the communication unit 108 to the P2P initiator mode. Furthermore, the control unit 101 records information indicating that the communication mode of the communication unit 108 has been set to the P2P initiator mode in the memory 110. In this case, the process ends.

In S510, the control unit 101 controls the communication unit 108 such that negative response data is transmitted in response to the data received by the communication unit 108 from the electronic device 200 in S503. In this case, the process returns from S510 to S501.

The first setting process, the second setting process, and the third setting process have been described. The control unit 101 may perform control such that at least any of the first setting process, the second setting process, and the third setting process is performed on the basis of settings made by a user. Alternatively, the control unit 101 may perform control such that at least any of the first setting process, the second setting process, and the third setting process is performed on the basis of the state of the power supply apparatus 100.

If the communication mode of the communication unit 108 has been set to the reader/writer mode in any of the first setting process, the second setting process, and the third setting process, the control unit 101 obtains the status information from the electronic device 200 through unidirectional communication with the electronic device 200. Furthermore, the control unit 101 performs the process for controlling the wireless supply of power to the electronic device 200 using the status information obtained from the electronic device 200. The predetermined data table may be referred to as a "certain address space", instead.

If the communication mode of the communication unit 108 has been set to the P2P initiator mode in any of the first setting process, the second setting process, and the third setting process, the control unit 101 obtains the status information from the electronic device 200 through bidirectional communication with the electronic device 200. Furthermore, the control unit 101 performs the process for controlling the wireless supply of power to the electronic device 200 using the status information obtained from the electronic device 200.

Thus, the power supply apparatus 100 according to the first embodiment selects one of the plurality of communication modes in accordance with the state of the electronic device 200. Therefore, since an appropriate communication mode may be selected for the electronic device 200, the power supply apparatus 100 may appropriately control the wireless supply of power to the electronic device 200.

Although the power supply unit 103 wirelessly supplies power using the magnetic resonance method in the first embodiment, the present invention is not limited to this. For example, the power supply unit 103 may wirelessly supply power using an electric field coupling method, or may wirelessly supply power using an electromagnetic induction method, instead. Furthermore, the power supply unit 103 may wirelessly supply power on the basis of a "Qi" standard specified by the Wireless Power Consortium (WPC).

Although the power supply antenna 109 is used for outputting the first power and the second power in the first embodiment, the present invention is not limited to this. For example, the power supply apparatus 100 may further include a communication antenna for performing wireless communication according to the NFC standard in addition to the power supply antenna 109. In such a power supply system, the power supply antenna 109 is used for outputting the second power but does not output the first power. In such a power supply system, the power supply apparatus 100 may transmit data to the electronic device 200 using the communication antenna thereof. In this case, the resonant frequency of the power supply antenna 109 and the resonant frequency of the communication antenna of the power supply apparatus 100 may be the same, or may be different. The resonant frequency of the communication antenna of the power supply apparatus 100 is set to a frequency for performing the wireless communication according to the NFC standard.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284435, filed Dec. 27, 2012, which is hereby incorporated by reference herein in its entirety.

What is claimed is:

1. A power supply apparatus comprising: a power supply unit; a first communication unit; a second communication unit; and a control unit configured to control the power supply apparatus to wirelessly supply power to a power receiving device the power supply unit, and wirelessly communicate with the power receiving device via the first communication unit; wherein in a case where the power supply apparatus wirelessly supplying power to the power receiving device via the power supply unit, the control unit determines, based on capability of the power receiving device, whether the first communication unit operates in a peer-to-peer initiator mode (P2P mode) or a reader/writer mode, and wherein, in a case where the power supply apparatus wirelessly communicates with the power receiving device via the first communication unit, the control unit determines, based on an authentication mode for wireless communication executed by the second communication unit, whether the first communication unit operates in the P2P mode or the reader/writer mode.

2. The power supply apparatus according to claim 1, wherein, if the power supply apparatus power supply apparatus wirelessly supplies power to the power receiving device via the power supply unit, the control unit determines, based on capability of the power receiving device and an operation mode of the first communication unit, whether the first communication unit operates in the P2P mode or the reader/writer mode.

3. The power supply apparatus according to claim 1, wherein, if the power supply apparatus wireless supplies power to the power receiving device, the control unit performs control in such a manner that after the first communication unit operates in either the P2P mode or the reader/writer mode, power is wirelessly supplied to the power receiving device via the power supply unit.

4. The power supply apparatus according to claim 1, wherein, the first communication unit in an operation in either the P2P mode or the reader/writer mode is smaller than power wirelessly supplied to the power receiving device via the power supply unit.

5. The power supply apparatus according to claim 1, wherein, power supplied to the power receiving device via the power supply unit is determined based on information received from the power receiving device as a result of the first communication unit having operated in either the P2P mode or the reader/writer mode.

6. The power supply apparatus according to claim 1, further comprising:
an antenna, wherein the antenna is shared between the power supply unit and the first communication unit.

7. The power supply apparatus according to claim 1, wherein, if a settlement process is performed, the control unit causes the first communication unit to operate in the reader/writer mode.

8. The power supply apparatus according to claim 1, wherein the first communication unit performs the short-range wireless communication on the basis of near field communication.

9. The power supply apparatus according to claim 1, wherein the second communication unit performs the wireless communication using a communication method different from a communication method used by the first communication unit.

10. The power supply apparatus according to claim 1, wherein the second communication unit performs the wireless communication using a wireless local area network.

11. The power supply apparatus according to claim 1, wherein the second communication unit performs the wireless communication using Bluetooth.

12. A method for controlling a power supply apparatus including a power supply unit, a first communication unit, and a second communication unit, the method comprising:
controlling the power supply apparatus for wirelessly supplying power to a power receiving device via the power supply unit and wirelessly communicating with the power receiving device via the first communication unit;
wherein in a case where the power supply apparatus wirelessly supplying power to the power receiving device via the power supply unit, whether the first communication operates in a peer-to-peer initiator mode (P2P mode) or a reader/writer mode is determined based on capability of the power receiving device;
if the power supply apparatus wirelessly communicates with the power receiving device via the first communication mode, whether the first communication unit operates in the P2P mode or the reader/writer mode is determined based on an authentication mode for wireless communication executed by the second communication unit.

13. A recording medium storing a program for causing a computer to execute a method for controlling a power supply apparatus including a power supply unit, a first communication unit, and a second communicating unit, the method comprising the steps of:
controlling the power supply apparatus wirelessly supplying power to a power receiving device and wirelessly communicating with the power receiving device via the first communication unit;
wherein, in a case where the power supply apparatus wirelessly supply power to the power receiving device, whether the first communication unit operates in a peer-to-peer initiator mode (P2P mode) or a reader/writer mode is determined based on capability of the power receiving device;
if the power supply apparatus wirelessly communicates with the power receiving device via the first communication unit, whether the first communication operates in the P2P mode or the reader/writer mode is determined based on an authentication mode for wirelessly communication executed by the second communication unit
wherein the second mode includes a mode for performing a communication performed by the second communication unit.

* * * * *